L. WIRTZ.
CLUTCH.
APPLICATION FILED DEC. 6, 1909.
1,013,979.
Patented Jan. 9, 1912.
4 SHEETS—SHEET 1.
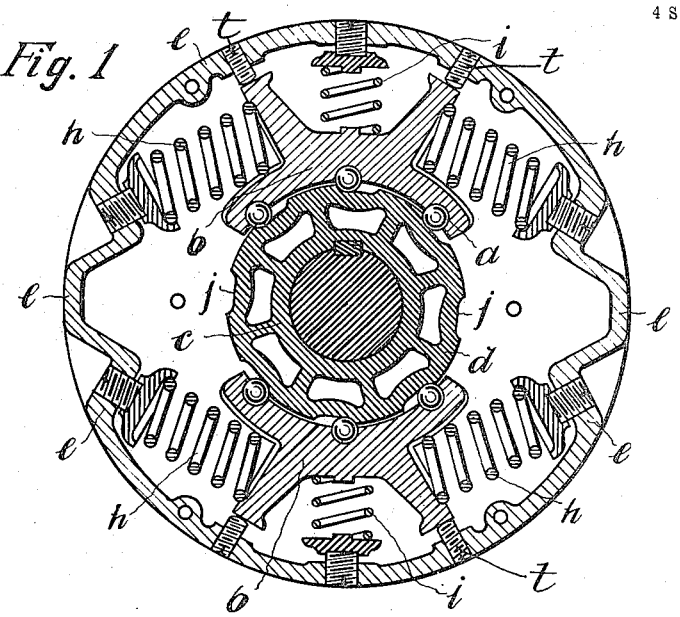
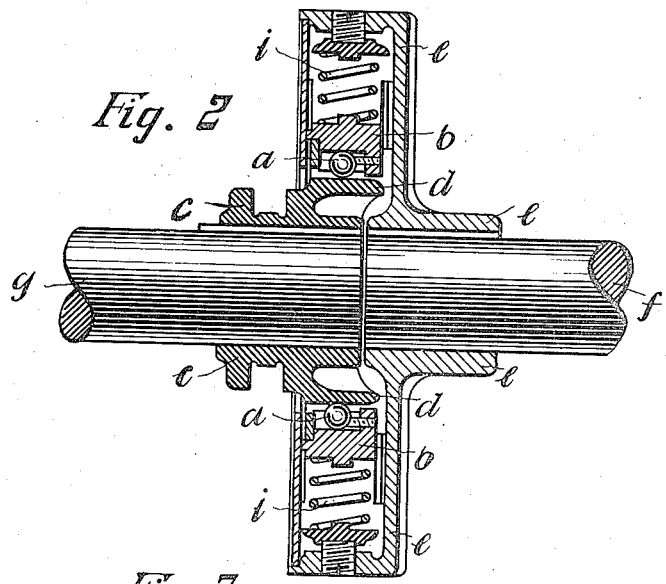
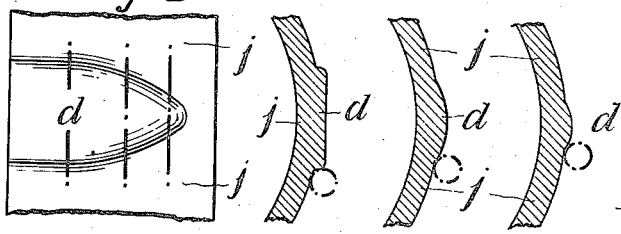

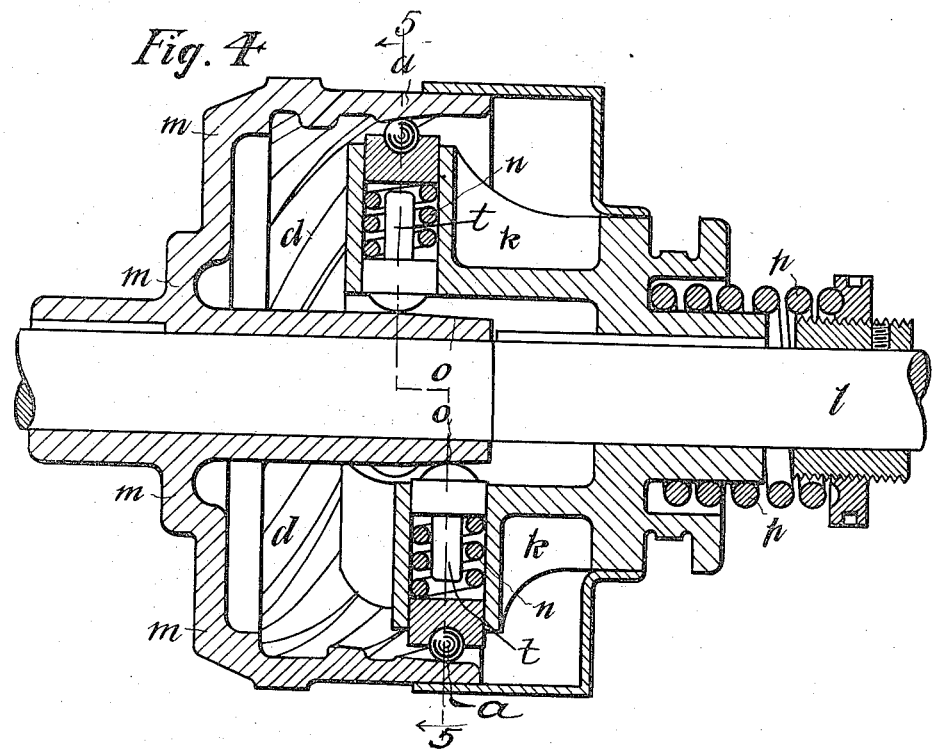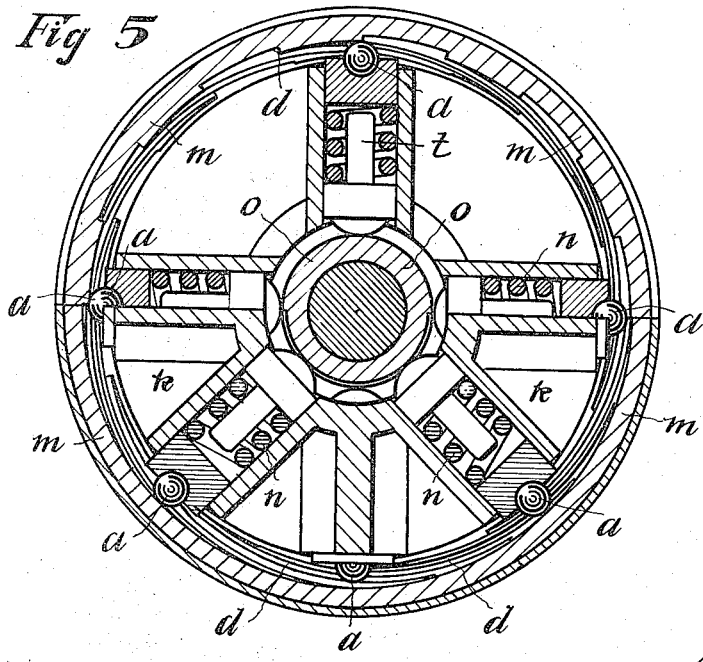

L. WIRTZ.
CLUTCH.
APPLICATION FILED DEC. 6, 1909.

1,013,979.

Patented Jan. 9, 1912.
4 SHEETS—SHEET 3.

Witnesses
R. Goodstein
J. Rabinowitz

Inventor
Luis Wirtz
by B. Singer
Atty

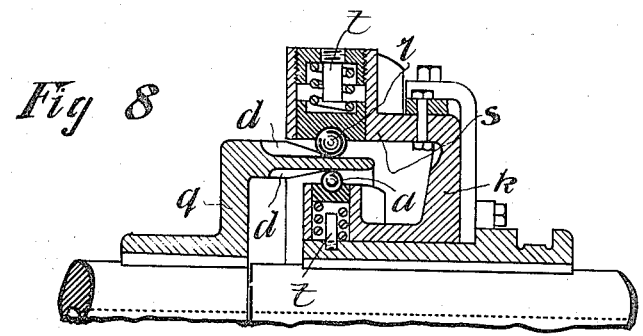
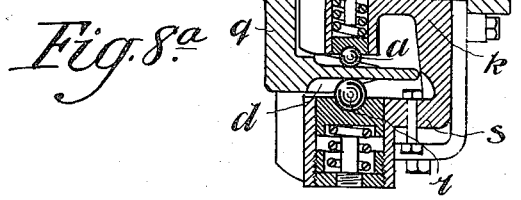
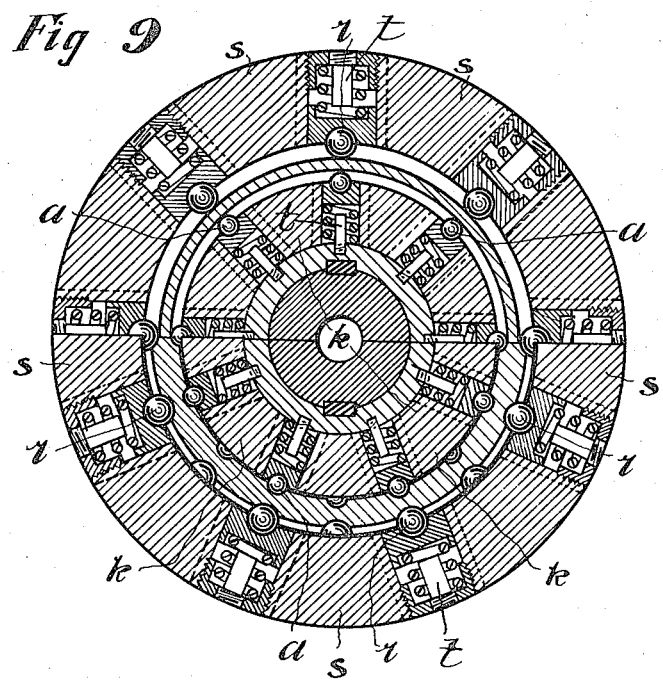

UNITED STATES PATENT OFFICE.

LUIS WIRTZ, OF EDGBASTON, BIRMINGHAM, ENGLAND.

CLUTCH.

1,013,979.  Specification of Letters Patent.  Patented Jan. 9, 1912.

Application filed December 6, 1909. Serial No. 531,632.

*To all whom it may concern:*

Be it known that I, LUIS WIRTZ, a citizen of Great Britain, and resident of Edgbaston, Birmingham, in the county of Warwick, England, have invented certain new and useful Improvements in Clutches, of which the following is a specification.

This invention comprises improvements in clutches and relates to those having balls arranged to give, or to assist in giving, the clutching effect.

The object of the invention is to provide a gradual clutching action and also preferably a final positive locking or coupling.

The invention consists in disposing the clutching balls to engage between ridges or waves to give a clutching effect the ridges or waves being formed to taper or gradually increase from the entry point of the balls so that as the balls enter them a gradually increasing clutching effect is produced. To this end the balls are employed in a slidable sleeve or carrier rolling along a hardened ring or shell which may be pressed by a spring or springs toward the balls or the balls may be pressed by springs toward the shell. The shell is equipped with the taper ridges or waves and the balls are arranged so that they may be moved axially to engage the ridges of the shell or the shell may be moved toward the balls. It is preferred to employ a second set of balls disposed so that when the clutching action is commenced, as one set ride off the ridges the next set is just commencing to bear on them so that a continual though gradual effect is obtained.

The clutch may be constructed with the balls carried on a sleeve working inside the ring or shell or they may be carried by a carrier surrounding the shell so that they work on the convex exterior of same or other sets may be employed to work on both the interior and exterior of the shell to give greater power with a small diameter clutch.

Figure 6:
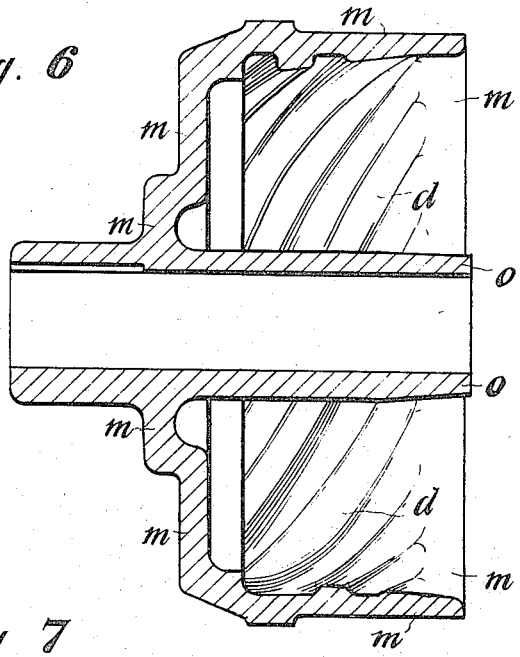
Figure 7:
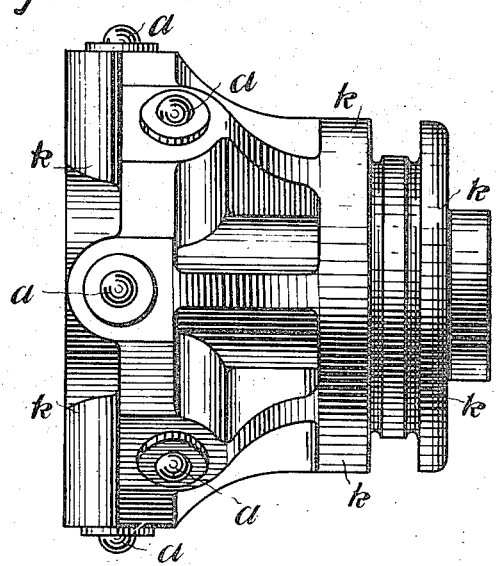

On the drawings: Figure 1. is a transverse sectional view of a clutch in which the balls engage ridges on an axially slidable member. Fig. 2. is a longitudinal section of this clutch. Fig. 3. is a diagrammatic view showing in plan a ridge with cross sections of it taken at various points indicated by dotted lines. Fig. 4. is a longitudinal section of a clutch in which the balls engage the inner face of a shell. Fig. 5 is a sectional view on line 5—5 of Fig. 4. Fig. 6. is a sectional view of the shell engaged by the balls. Fig. 7. is an elevation of the ball carrier. Figs. 8 and 8$^a$ are longitudinal sectional views showing two positions of the clutch in which the balls act upon both faces of a shell. Fig. 9. is a transverse section thereof.

In the construction shown at Figs. 1, 2, and 3, a clutch is built up in accordance with the invention in which the balls $a$ are arranged in pockets in shells $b$ and surround an axially slidable member $c$ provided with ridges or waves $d$ on its surface. The shells $b$ are flexibly connected to a member $e$ which is keyed to and rotates with one shaft $f$ while the slidable member $c$ is connected to the shaft $g$ so as to rotate with it. The connection of the shells to the member is by the springs $h$ and the shells $b$ are further urged toward the member $c$ by springs $i$ and all these springs are adjustable as to their power, as shown. The ridges or waves $d$ on the member $c$ are here shown arranged axially on its periphery but they may be arranged helically as is illustrated in another form of clutch at Figs. 4 to 7. In any case they commence from the normal plane of the periphery and become gradually more pronounced and more sharply defined until a final formation is arrived at over which the balls $a$ cannot travel.

Supposing the shaft $f$ to be the driving shaft, the position of the balls $a$ in respect to the member $c$ when the shafts are uncoupled is on the plain periphery of the member, see $j$, Fig. 3. If now the member $c$ is axially moved farther into the member $e$ by the usual shifting fork or other means, the balls are brought first against the extremities of the ridges $d$ where there are slight departures from the normal plane, and as the balls pass over them, as the shaft $f$ and member $e$ rotate a slight clutching effect is obtained. Upon a further movement of the member $c$ into the member $e$ the balls come against more pronounced parts of the ridges and more pressure is put upon the springs $i$ as the balls pass over the ridges and a more pronounced clutching effect is obtained, and as the movement continues the clutching gradually increases until the shaft $g$ has taken up the speed of the shaft $f$ and a final direct coupling is formed when the balls are between the most pronounced portions of the ridges.

If desired more sets of balls may be used to give additional strength and these may be used as illustrated in connection with another form of clutch at Fig. 7 and these in conjunction with helical ridges give a more continuous effect in the early stages of the clutching.

In the construction of clutch shown at Figs. 4, 5, 6, and 7, the balls $a$ are carried in a carrier $k$ arranged to move axially on the shaft $l$. The ridges or waves $d$ are arranged on the interior face of a shell $m$ which is keyed to the other shaft or part to be clutched. The balls are forced out by springs $n$ and as the carrier is axially moved into the shell $m$, the gradual clutching effect ending in a final positive coupling is obtained. It will be observed that in these drawings a slightly coned member $o$ is arranged on the shell $m$ and the springs $n$ are thereby further compressed and exert more power on the balls as the carrier is moved inwardly. This however is not essential as the base of the spring may simply rest in a recess of the carrier in the manner seen in the clutch illustrated at Fig. 8. Where the cone is used it may be arranged so that it can be adjusted from the exterior. The ridges $d$ in this example (Figs. 4 to 7) are arranged helically in the shell; this is done to insure a slower and more gradual entrance of the clutching balls. This type is suitable for motor car work and is then provided with a spring $p$ at the back of the carrier so that on operation of the clutch fork by the usual pedal, the clutch goes in under action of the spring. In these clutches the cone $o$ is more useful as it serves to store the axial impulse of spring $p$ and give it out to the radial springs behind the balls during the clutching action. Of course straight ridges may replace the helical ones in this clutch if desired to have a quicker action. As shown at Fig. 4 more than one set of balls may be used in this clutch arranged as shown and then one set are just engaging the helical ridges or waves as the first set are leaving them so that a more continuous clutching action is obtained in the first stages of coupling.

In the arrangement shown at Figs. 8 and 9, the ridges $d$ are formed on each side of a shell $q$ and balls $a$ and $r$ engage these. The balls are arranged with springs behind them as in the last example but the carrier $k$ has an additional portion $s$ in which the second or outer set of balls $r$ are carried. The clutching action is the same but greater powers can be obtained with a small diameter clutch. The shell is supported by the sets of balls against the pressure of each other and any tendency to bursting is obviated.

In all cases the springs may be provided with stops $t$ forming a limit to the compression so that in the final position of the balls in the most pronounced parts of the waves there is no possibility of the balls riding over the ridges or waves.

With this invention a gradual clutching action is obtained in a clutch which allows of quick engagement and this is invaluable in heavy power and quick working machines.

What I claim then is:

1. A ball clutch comprising in combination, coacting rotatable clutching members, one of said members having a plurality of ball-engaging surfaces increasing in size in a direction axially away from the balls whereby the latter may ride over said surfaces at their more shallow portions but will be arrested by the larger portions of said surfaces, the companion clutch member being provided with means for positively engaging the balls to prevent bodily movement thereof independently of such member but to permit rotation of the balls within said means whereby upon axial movement of one clutch member toward the other, the said balls will first engage the more shallow portions of said surfaces, to effect partial clutching of said members and, upon further movement, will engage the larger portions of said surfaces to positively clutch said members in locked relation.

2. A ball clutch comprising in combination, clutch balls, coacting rotatable clutch members, one of said members having an initial smooth ball-engaging surface and ball-locking surfaces gradually increasing in size in a direction axially from said balls and from said smooth surface whereby the balls may ride over said smooth surface and the more shallow portion of said ball-locking surfaces but will be arrested by the larger portions of said ball-locking surfaces, the companion member being provided with means for positively engaging the balls to prevent bodily movement thereof independently of such member but to permit rotation of the balls within said means, whereby upon axial movement of one clutch member toward the other said balls will engage the shallower portions of said ball-locking surfaces to effect partial clutching of said members and, upon further movement, will engage the larger portions of said ball-locking surfaces to positively lock said members in clutched relation.

3. A ball clutch comprising in combination, coacting rotatable clutch members, one of said members having a plurality of spirally arranged tapering ball-engaging surfaces with the more shallow portions toward the balls and the larger portions axially away from the balls whereby the latter may ride over the shallow portions but will be arrested by the larger portions, the companion member being provided with means for positively engaging the balls to prevent bodily movement thereof independently with respect to such member but to permit rotation of the balls within said means whereby upon axial movement of one clutch member toward the other the said balls will first engage the more shallow portions of said surfaces to effect partial clutching of said members and, upon further movement, will engage the larger portions of said surfaces to positively lock the said members in clutched relation.

4. A ball clutch comprising in combination, coacting rotatable clutch members, one of said members having an initial smooth surface and a plurality of spirally arranged ball-engaging portions merging with said smooth surface and tapering therefrom whereby the balls after passing the smooth surface may ride over the more shallow tapering surfaces but will be arrested by the larger portions of said tapering surfaces, the companion clutch member being provided with sockets embracing the balls to a sufficient extent to prevent bodily movement thereof independently of said member but to permit rotation of the balls within said socket whereby upon axial movement of one clutch member toward the other the balls will first engage the smooth and then the more shallow portions of said tapering surfaces to partially effect clutching of said members and, upon further movement, will engage the larger portions of said surfaces to positively lock said members in clutched relation.

5. A ball clutch comprising in combination, clutch balls, coacting rotatable clutching members, one of said members having a plurality of ball-engaging surfaces increasing in size in a direction axially away from the balls whereby the latter may ride over the shallower portions and be arrested by the larger portions of said surfaces, the other clutch member engaging the balls whereby upon axial movement of one member toward the other the balls will first engage the more shallow portions to effect partial clutching of said members and, upon further movement, will engage the larger portions of said surfaces to positively lock said members in clutched relation, and means for gradually increasing the force of engagement of said balls with said surfaces as the balls reach the larger portions thereof.

6. A ball clutch comprising in combination, coacting rotatable clutching members, one of said members having a plurality of ball-engaging surfaces increasing in size in a direction axially away from said balls whereby the latter may ride over the shallow portions and be arrested by the larger portions of said surfaces, the other of said clutch members engaging said balls whereby upon axial movement of one member toward the other the balls will first engage the more shallow portions to effect partial clutching of said members, and, upon further movement, will engage the larger portions of said surfaces to positively lock said members in clutched relation, and yielding means for gradually increasing the force of engagement of said balls with said surfaces as the balls reach the larger portions thereof.

7. A ball clutch comprising in combination, coacting rotatable clutching members, one of said members having a plurality of ball-engaging surfaces increasing in size in a direction axially away from said balls whereby the latter may ride over the shallow portions and be arrested by the larger portions of said surfaces, the other of said clutch members engaging said balls whereby upon axial movement of one member toward the other the balls will first engage the more shallow portions to effect partial clutching of said members, and, upon further movement, will engage the larger portions of said surfaces to positively lock said members in clutched relation, and radially acting yielding means for gradually increasing the force of engagement of said balls with said surfaces as the balls reach the larger portions thereof.

8. A ball clutch comprising in combination, coacting rotatable clutch members, one of said members having a plurality of ball-engaging surfaces increasing in size axially away from said balls whereby the latter may ride over the shallow portions and be arrested by the larger portions of said surfaces, the other of said members having radially movable ball-holding means, and a device on the first named member for moving said means outwardly when one member is advanced toward the other whereby the force of engagement of said balls with said surfaces is increased upon such relative movement of said members.

Signed at Birmingham in the county of Warwick England this 15th day of November A. D. 1909.

LUIS WIRTZ.

Witnesses:
F. GILBERT BRETTELL,
E. S. BRETTELL.